July 24, 1928. 1,678,585
T. A. CONLON
CART
Filed Dec. 22, 1925  2 Sheets-Sheet 1
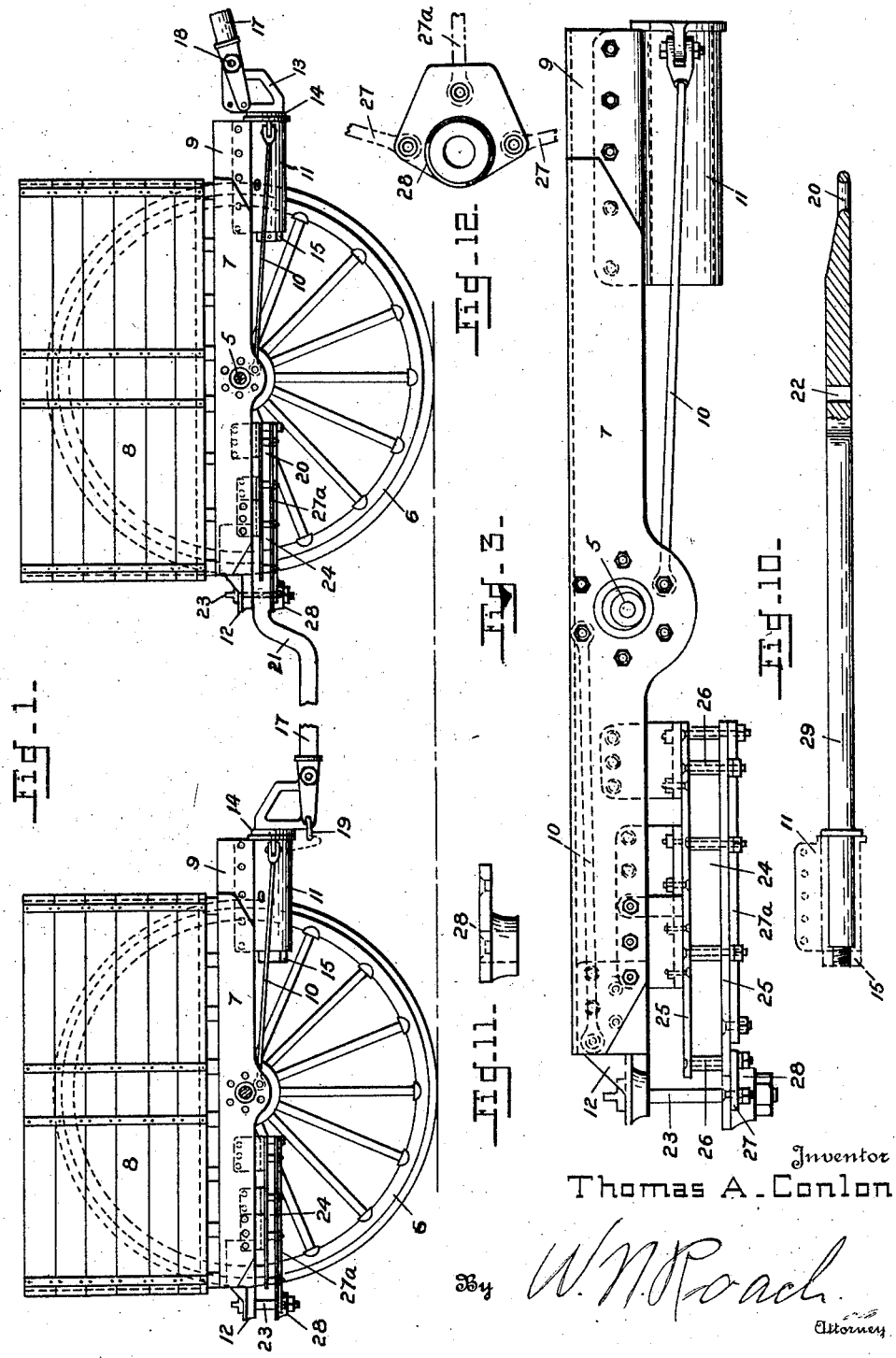
Inventor
Thomas A. Conlon July 24, 1928. 1,678,585
T. A. CONLON
CART
Filed Dec. 22, 1925 2 Sheets-Sheet 2
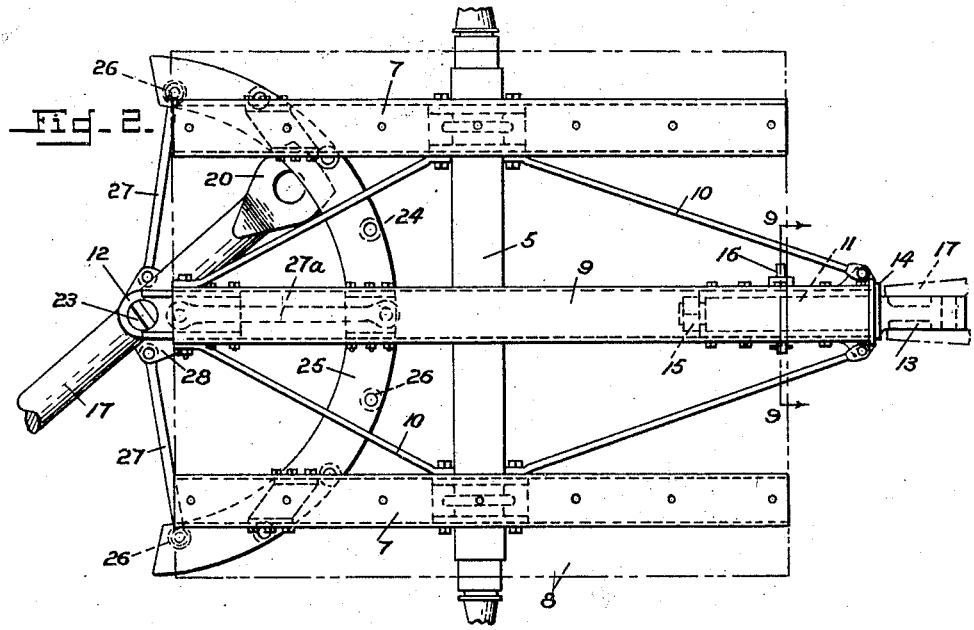
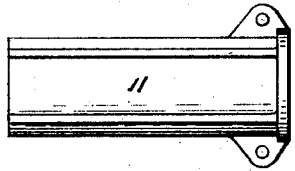
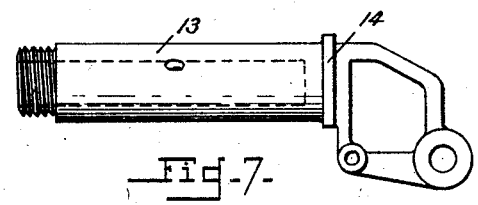
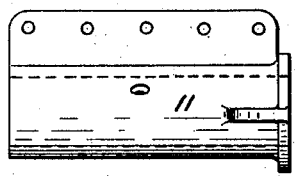
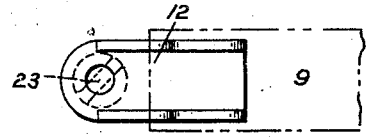
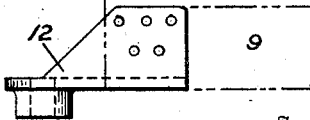
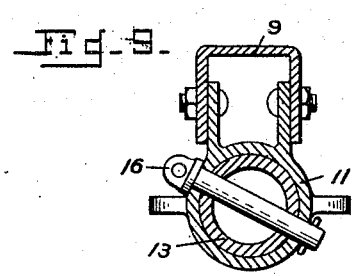
Inventor
Thomas A. Conlon
By W. N. Roach.
Attorney Patented July 24, 1928.

1,678,585

UNITED STATES PATENT OFFICE.

THOMAS A. CONLON, OF SILVER SPRING, MARYLAND.

CART.

Application filed December 22, 1925. Serial No. 77,079.

(GRANTED UNDER THE PROVISIONS OF THE ACT OF MARCH 3, 1883, 22 STAT. L., 625.)

The invention described herein, if patented, may be manufactured and used by or for the Government for governmental purposes without the payment to me of any royalty thereon.

This invention relates to carts and more particularly it has reference to the draft and trailer connections thereof.

The principal object of the present invention is to provide a general utility cargo cart, two or more of which may be coupled in series to form a strong, self-supporting wagon or train, readily coupled and uncoupled, whose connections to draft and to each other allow the axles to move relative to one another and to draft so as to permit traveling over uneven ground.

A further object is to provide a simple arrangement whereby the height of the drawbar attachment may be readily altered.

To these and other ends, my invention consists in the construction, arrangement, and combination of elements described hereinafter and pointed out in the claims forming a part of this specification.

A practical embodiment of the invention is illustrated in the accompanying drawings, wherein:

Fig. 1 is a view in side elevation showing two of my cargo carts coupled in train;

Fig. 2 is a plan view of one of the carts with the body removed and showing the drawbar in place;

Fig. 3 is a view in side elevation of the chassis of the cart;

Figs. 4 and 5 are detail views in plan and elevation of the socket member;

Fig. 6 is a detail view of the adaptor;

Figs. 7 and 8 are detail views of the rear bracket;

Fig. 9 is a detail sectional view on the line 9—9 of Fig. 2;

Fig. 10 is a detail view of an alternate type of draft bar for the trailer cart;

Figs. 11 and 12 are detail views in elevation and plan of the keeper plate.

Referring to the drawings by numerals of reference:

In carrying out the invention there is provided an axle 5 on which are mounted the wheels 6 and the side frames 7—7 which carry the cargo body 8. Also mounted on the axle centrally between the side frames and parallel therewith is a draft rail 9 braced front and rear by rods 10 secured to the side frames. The draft rail is preferably U-shaped in cross section to provide for convenient attachment at its forward end of a socket member 11, and its rear end of an apertured bracket 12.

Inserted in the socket 11 is the stem of a drawbar support or adaptor 13 which is held against longitudinal displacement by means of the flange 14 and the nut 15 so that the adaptor may be free to rotate with respect to the socket when imparting the pull to the draft rail 9. However, the connection between the socket and the adaptor may be made rigid when so desired by placing a pin 16 diametrically through these members, see Figs. 2 and 9.

The head of the adaptor to which the clevis of the drawbar 17 is secured is offset with respect to its stem so that by reversing it the height of the draft may be altered to provide for different types and classes of traction. It is obvious that a suitable pole may be substituted for the drawbar if the cart is to be drawn by animals.

Provision is made for securing the drawbar at two points, the forward securing bolt 18 constituting the service coupling pin used by itself in the lead cart and the rear bolt 19 used when the cart is drawn individually and also serving when in place on the trailer cart to rigidly hold the draft bar in forming a self supporting wagon or trail.

In one embodiment of the invention, the forward portion of the drawbar, which terminates in a lunette 20, is offset as at 21 for a purpose presently to be described and is formed with an aperture 22 for receiving (when the cart is trailing) the coupling pin 23 which is insertable through the bracket 12 at the rear of the draft rail 9 of a similar cart.

Suspended at the rear of the cart from the side frames 7 and draft rail 9 is an arcuate guide 24 in the nature of a fifth wheel. This guide consists of spaced rails 25 between which the lunette of a trailer drawbar is free to move until brought up against the end spacer bolts 26—26 so that in executing a turning movement the trailer cart will follow in the track of the lead cart. As shown, the guide 24 is approximately in the plane of the socket 11 and when the carts are coupled in train the offset 21 of the trailer drawbar compensates for the offset of the adaptor. The offset 21 possesses another advantage in that by reversing its application in the two positions of the adaptor there may be provided additional changes in the height of draft. If desired, however, the position of the guide 24 may be raised or lowered with respect to the socket so as to eliminate the presence of the offset in the drawbar.

A pair of radial arms 27—27 secured to the extremities of the arcuate guide 24 and a similar arm 27$^a$ secured centrally of the guide carry a keeper plate 28 for receiving the lower portion of the coupling pin 23.

By virtue of the swivel mounting of the adaptor 13 the axles of the carts when in train may move in planes relative to one another and to draft so as to permit traveling over rough ground without the aid of springs.

In Fig. 10, is shown an alternate type of draft bar 29 to be used on trailer carts. The forward portion of this bar is similar to the bar 17 but the rear portion is designed to be directly swiveled in the socket 11 instead of employing the adaptor 13.

In case of damage to one of the carts when they are being hauled in train the damaged cart may be readily uncoupled and removed and the train again made up without appreciable delay.

While in the foregoing there has been illustrated and described such combination and arrangement of elements as constitutes the preferred embodiment of my invention, it is nevertheless desired to emphasize the fact that interpretation of the invention should only be conclusive when made in the light of the subjoined claims.

I claim:

1. A cart embodying an axle, side frames secured to the axle, a central draft rail on the axle, a socket member on the front end of the draft rail, an apertured bracket on the rear end thereof, an adapter having an offset head swiveled in the socket, a removable pin passing diametrically through the socket and adapter, a drawbar pivoted to the head of the adapter, removable means for rigidly connecting the drawbar to the adaptor, said drawbar offset intermediate its ends, the forward portion formed with an aperture and terminating in a lunette, an arcuate guide consisting of spaced rails secured at the rear of the cart to the side frames and draft rail and substantially in the plane of the socket member, radial arms secured to the extremities of the guide, and a keeper plate carried by said arms and disposed beneath the bracket on the draft rail.

2. A cart embodying an axle, side frames secured to the axle, a central draft rail on the axle, a socket member on the front end of the draft rail, an apertured bracket on the rear end thereof, an adaptor having an offset head swiveled in the socket, a removable pin passing diametrically through the socket and adaptor, a drawbar pivoted to the head of the adaptor, removable means for rigidly connecting the drawbar to the adaptor, said drawbar offset intermediate its ends, the forward portion formed with an aperture and terminating in a lunette, an arcuate guide consisting of spaced rails secured at the rear of the cart to the side frames and draft rail and substantially in the plane of the socket member.

3. A cart embodying an axle, side frames secured to the axle, a central draft rail on the axle, a socket member on the front end of the draft rail, an apertured bracket on the rear end thereof, an adaptor having an offset head swiveled in the socket, a removable pin passing diametrically through the socket and adaptor, a drawbar pivoted to the head of the adaptor, removable means for rigidly connecting the drawbar to the adaptor, said drawbar offset intermediate its ends, the forward portion formed with an aperture and terminating in a lunette, and an arcuate guide consisting of spaced rails secured at the rear of the cart.

4. A cart embodying an axle, a body thereon, a central draft rail on the axle, a socket member on the front end of the rail, an adaptor having an offset head swiveled in the socket, a drawbar pivoted to the head of the adaptor, removable means for rigidly connecting the drawbar and adaptor, an arcuate guide consisting of spaced rails secured at the rear of the cart, and means at the rear of the draft rail for pivotally securing a trailer cart.

5. A cart including a pivoted drawbar mounted for swiveling movement, removable means for rigidly connecting the drawbar to the cart, means at the rear of the cart for pivotally coupling the drawbar of a trailer cart, and an arcuate guide forwardly of said coupling means for controlling the movement of the trailer drawbar.

6. A cart including a pivoted drawbar mounted for swiveling movement, means at the rear of the cart for pivotally coupling the drawbar of a trailer cart, and an arcuate guide forwardly of said coupling means, for controlling the movement of the trailer drawbar.

7. A cart including a drawbar, means at the rear of the cart for pivotally coupling the drawbar of a trailer cart, and an arcuate guide forwardly of said coupling means for controlling the movement of the trailer drawbar.

8. A cart embodying a socket member, an adaptor swiveled therein, a removable pin passing diametrically through the socket and adaptor, a drawbar pivoted eccentrically to the head of the adaptor so as to provide alternate heights of draft, said drawbar offset to provide further variations in the height of draft when reversed, and removable means for rigidly connecting the drawbar and adaptor.

9. A cart embodying a socket member, an adaptor swiveled therein, a drawbar pivoted eccentrically to the head of the adaptor so as to provide alternate heights of draft, said drawbar offset to provide further variations in the height of draft when reversed.

THOS. A. CONLON.